March 14, 1961  G. M. SPEAR  2,974,398
CUTTER FOR SPIRAL BEVEL AND HYPOID GEARS
Filed Jan. 29, 1958  4 Sheets-Sheet 1

INVENTOR.
GILMORE M. SPEAR
BY
Richard W. Treverton
ATTORNEY

March 14, 1961 G. M. SPEAR 2,974,398
CUTTER FOR SPIRAL BEVEL AND HYPOID GEARS
Filed Jan. 29, 1958 4 Sheets-Sheet 2

March 14, 1961  G. M. SPEAR  2,974,398
CUTTER FOR SPIRAL BEVEL AND HYPOID GEARS
Filed Jan. 29, 1958  4 Sheets-Sheet 3

March 14, 1961  G. M. SPEAR  2,974,398
CUTTER FOR SPIRAL BEVEL AND HYPOID GEARS
Filed Jan. 29, 1958  4 Sheets-Sheet 4

United States Patent Office 2,974,398
Patented Mar. 14, 1961

2,974,398

CUTTER FOR SPIRAL BEVEL AND HYPOID GEARS

Gilmore M. Spear, Rochester, N.Y., assignor to The Gleason Works, Rochester, N.Y., a corporation of New York Filed Jan. 29, 1958, Ser. No. 711,913

3 Claims. (Cl. 29—105)

The present invention relates to an improved face mill cutter adapted particularly for rough cutting non-generated tapering depth spiral bevel and hypoid gears which are afterwards to be finished by the method of Patent No. 2,857,819 to E. Wildhaber and C. B. King, and application Serial No. 705,931 filed December 30, 1957, by L. O. Carlsen and C. B. King, or by a similar method.

When rough cutting, the cutter axis is perpendicular to the root plane of the gear, i.e. the plane swept by the tips of the rotating cutter blades, whereas when finishing the gear by the new method of the afore-mentioned patent and application the corresponding axis is substantially inclined to this plane and the tips of the blades are made to follow the root plane by moving the tool along its axis of rotation. As a result of the different locations of the cutter axis, the rough cutting leaves a layer of stock, to be removed in the finishing operation, which varies considerably in thickness from one part of the tooth surface to another. This variation increases the load on the finishing tool and in some cases may even be so great as to make it impractical to finish cut by the new method gears which have been rough cut in the conventional manner. The primary object of this invention is a cutter which will produce tooth surfaces which closely approximate the shape of the finished surfaces and thereby make it possible to leave on the tooth, for removal in the finishing operation, a layer of stock that is more uniform in thickness than has been possible heretofore.

According to the invention a face mill cutter for rough cutting non-generated spiral bevel or hypoid gears of tapering tooth depth, comprises blades collectively presenting side cutting edges for cutting one side of the teeth and other side cutting edges for cutting the opposite side of the teeth, each such edge having substantially straight and adjacent distal and proximal sections of different pressure angle, the distal section of each such edge corresponding in length to the depth of the tooth at its small end on the related tooth side, each of the first-mentioned edges having the pressure angle of its proximal section larger than that of its distal section, and each of said other edges having the pressure angle of its proximal section smaller than that of its distal section.

The invention will be described in detail with reference to the accompanying drawings, wherein.

Figure 7:
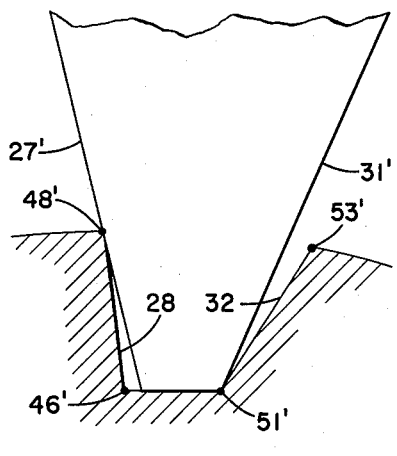
Figs. 7 and 8 are views in the cutter axial plane showing the relation of conventional cutter blades to a gear tooth space, the views being respectively at the small and large ends of the space.
Figure 9:
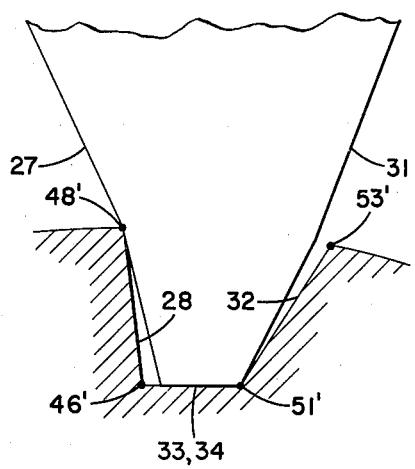
Figure 8:
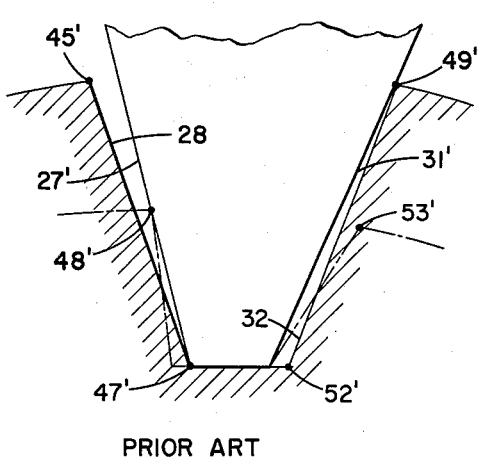
Figure 10:
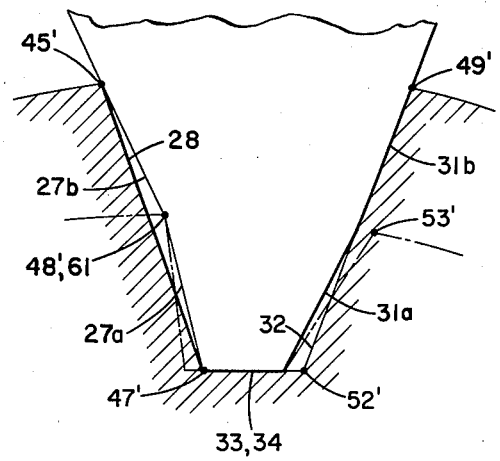
Figure 11:
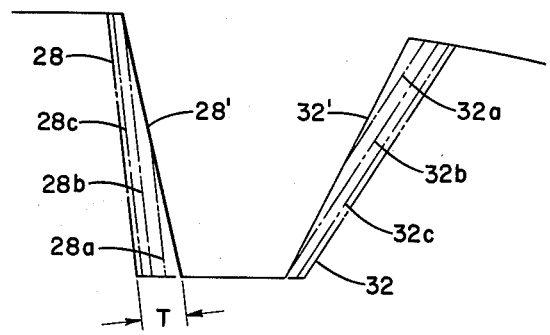
Figure 12:
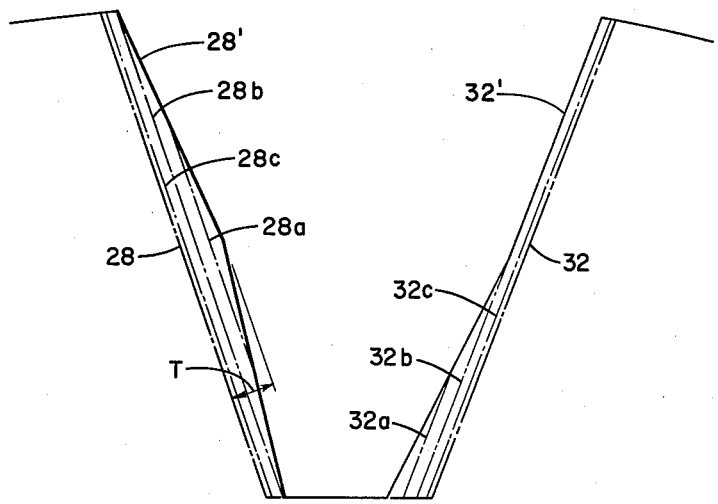

Figs. 9 and 10 are similar to Figs. 7 and 8 respectively but show the cutter blades of the present invention; and, Figs. 11 and 12 are views in the respective planes of Figs. 9 and 10, showing the layers of stock removed by successive blades of a finishing cutter.

Figure 1:
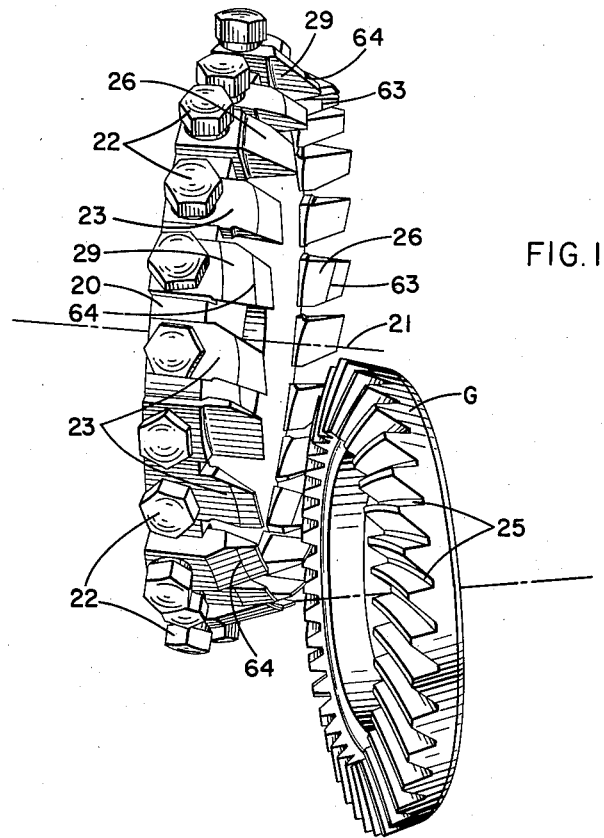
Fig. 1 is a perspective view showing a cutter of the invention disposed in cutting relationship to a hypoid gear.

Rough cutting of a non-generated spiral bevel or hypoid gear, such as G in Fig. 1, is effected with a rotary face mill cutter comprising a circular head 20 carrying a plurality of cutting blades which extend therefrom in the direction of the axis of rotation 21 of the cutter. Cutting is effected by a relative feed motion between the rotating cutter and the gear in the direction of the cutter axis. The gear does not rotate during cutting, but at the conclusion of the cutting of each tooth space is indexed or rotatively advanced by one pitch preparatory to cutting the next tooth space. The cutter illustrated is of the inserted blade type wherein the shanks of the blades are secured in slots in the head by screws 22. However in other cases the cutter may be of the solid type in which the blades are integral with the head.

Figure 2:
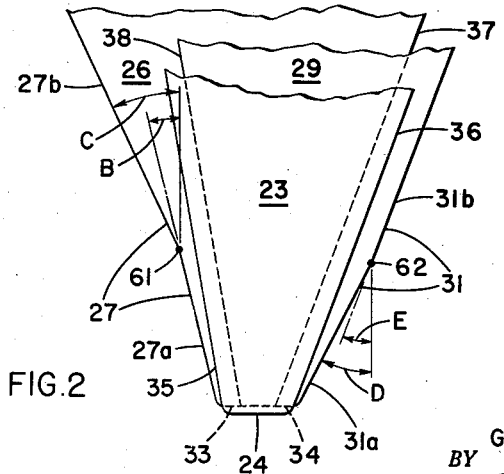
Fig. 2 is a schematic view showing the relationship of the three different kinds of blades employed in the particular cutter shown in Fig. 1.
Figures 5, 6:
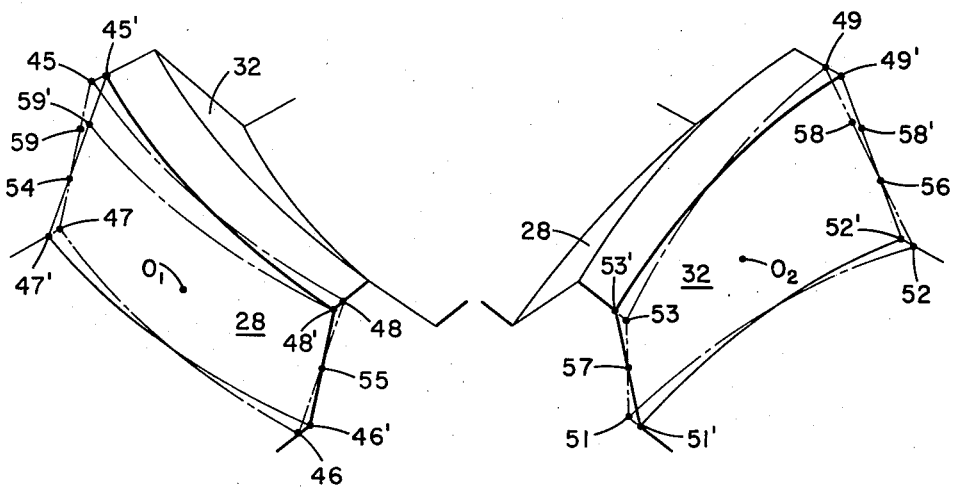
Figs. 5 and 6 are views showing a tooth in perspective, Fig. 5 viewing it from its convex side and Fig. 6 from its concave side.

The particular cutter shown has three kinds of blades: bottom cutting blades 23 whose tip edges 24 cut the root surfaces 25 of the gear, inside cutting blades 26 whose inside edges 27 cut the convex sides 28 of the teeth, Fig. 5, and outside cutting blades 29 whose outside edges 31 cut the concave tooth sides 32, Fig. 6. A bottom cutting blade 23 precedes each side cutting blade. Alternate side cutting blades comprise inside blades 26 and outside blades 29. The relationship between the several blades is illustrated in Fig. 2 wherein the edges of three blades 23, 26 and 29 are shown as they would appear if brought into the same plane containing the cutter axis. As shown, greatly exaggerated, the bottom cutting blades 23 are longer than the side cutting blades 26 and 29 so that the respective tip cutting edges 33 and 34 of the latter cannot cut, although they would be capable of doing so if blades 23 were omitted. Similarly the inside and outside edges 35 and 36 of the bottom cutting blades 23 cannot cut by reason of the fact that they are inset from edges 27 and 31. The clearance side edges 37 and 38 of blades 26 and 29, respectively, are also inset from edges 31 and 27 and hence are non-cutting. In some cutters the bottom cutting blades 23 are omitted, their function being taken over by the tip edges of the side cutting blades. In still other cutters every blade may have three cutting edges corresponding respectively to edges 24, 27 and 31. The present invention is not concerned with the arrangement of blades in the cutter head, or with the distribution of the cutting edges among the several blades, but is concerned primarily with the effective profile shape of the side cutting edges 27 and 31. This shape may be employed in cutters of any of the several types referred to in this paragraph.

The feature of the present invention is that the blade pressure angle, i.e. the angle between the cutter axis and the cone swept by the side cutting edge, is different for different sections of the side cutting edges 27 and 31 in the following way: The pressure angle B, Fig. 2, of the distal section 27a of inside cutting edge 27 is smaller than the pressure angle C of the proximal section 27b of the edge, while the pressure angle D of the distal section 31a of outside cutting edge 31 is larger than the pressure angle E of the proximal section 31b. The reason for this pressure angle arrangement, and its effect, will now be described.

When rough cutting, the cutter axis is so positioned that the plane traversed by the tips of the cutter blades is coincident with the intended root surface 25 of the tooth space being cut. That is, referring to Fig. 3 the cutter axis is positioned to lie in a plane containing a line 41 which is characterized by (a) lying in a plane containing the gear axis and a selected mean point P of the tooth space being cut, and (*b*) being perpendicular to the root plane 42 of the gear, i.e. the plane of the root surface 25. Provided that the side cutting edges of the cutter blade are straight as considered in a plane containing the cutter axis, the opposite sides of each tooth space are conical surfaces.

However when finish cutting such spiral bevel and hypoid gears by the new method of the afore-mentioned patent applications, which method will hereinafter be referred to as the helicoidal method, the axis of the finishing face mill cutter is disposed in a plane containing a line 43 which is characterized by (*a*) lying, as does line 41, in a plane containing the gear axis and a selected mean point P of the tooth space, but (*b*) unlike line 41, being perpendicular to the face plane 44 of the gear, or approximately so. The finishing blades are made to follow the root surface 25 by being moved in the direction of the cutter axis as they pass, in their rotative motion, from end to end of the tooth space. The tooth sides thus are cut as helical surfaces rather than as conical surfaces.

The gears to be finish cut or ground by the helicoidal method are preferably rough cut by the conventional method which is faster inasmuch as it does not involve axial motion of the cutter except for the usual infeed. No significant difference in tooth shape arises from the fact that the roughed tooth surfaces are conical while the finished surfaces are helical, for a conical surface can be chosen which will match a helical surface with exceedingly great accuracy over an entire tooth side. But the relative inclination between the cutter axes, which is a function of the angle A in Fig. 3 and of the spiral angle of the tooth space, results in the conical surfaces being warped with respect to the helical surfaces. The nature of this warpage is shown greatly exaggerated in Figs. 5 and 6 wherein the conical surfaces are shown in broken lines and the helical surfaces in full lines. In these views it is assumed, for ease of comparison, that the conical and helical surfaces are both cut to the same depth, so that they will coincide at points $O_1$ and $O_2$.

In the case of the convex side 28 of the tooth, Fig. 5, the warping is such that the points 45 and 46, respectively at the top of the heel or large end of the conical surface and at the bottom of the toe of the same surface, lie outwards of the corresponding points 45' and 46' of the helical surface; while the points 47 and 48 at the bottom of the heel and the top of the toe of the conical surface lie inwards of the corresponding points 47' and 48' of the helical surface. On the concave side 32 of the tooth, Fig. 6, the warping is reversed, the top point 49 of the heel and the bottom point 51 of the toe of the conical surface being inwards of corresponding points 49' and 51' of the helical surface, while the bottom point 52 of the heel and top point 53 of the conical surface are outwards of the corresponding helical surface points 52' and 53'. The helical and conical surfaces intersect at points 54 and 55 on the convex side 28, and at points 56 and 57 on the concave side 32.

Figure 3:
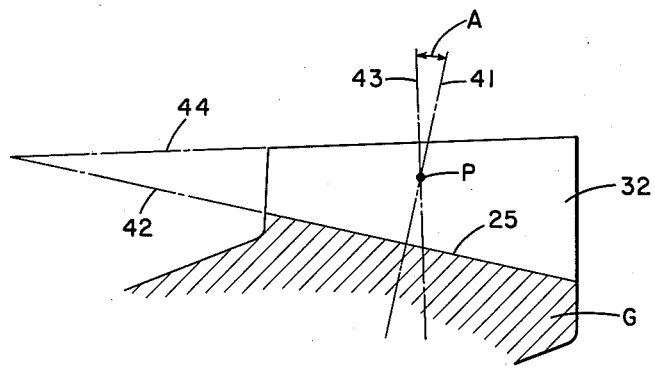
Figs. 3 and 4 are side views of one tooth of the gear.
Figure 4:
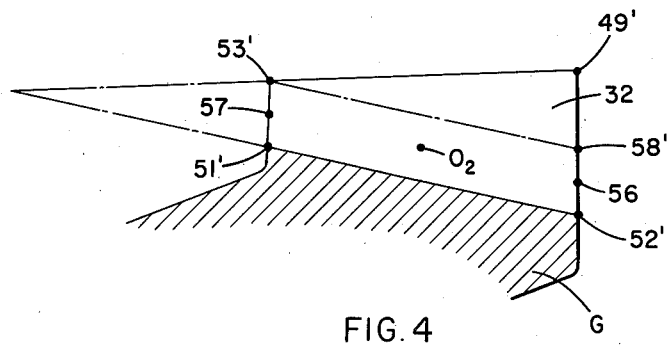

Given a particular angle A, Fig. 3, a disposition of the cutter for the conical surfaces that is most favorable to maximum removal of stock is that which will result in distances 46—46', 47—47', 48—48', 51—51', 52—52' and 53—53' being equal or nearly equal. In this condition it is found that point $O_2$ lies at the center of a trapezoid 51'—52'—58'—53', Fig. 4, and that point $O_1$ lies at the center of a similar trapezoid 46'—47'—59'—48', the point 58 being located at the same distance from point 56 as point 52, and the point 59 being the same distance from point 54 as point 47. In this situation the conical surface points 58' and 59' are at distances from their corresponding helical surface points 58 and 59 approximately equal to the respective distances 52—52' and 47—47'. However the distance 45—45' is greater than the distance 59—59' in substantially the same ratio that the distance 54—45 is greater than distance 54—59.

Similarly the distance 49—49' is greater than distance 58—58' in substantially the same ratio that 56—49 is greater than 56—58.

To illustrate further the non-uniformity in thickness of the layers of stock left for helicoidal finishing by a conventionally roughed gear, Figs. 7 and 8 respectively show a conventional roughing cutter blade in the small and large ends of a helicoidally cut tooth space, the blade having inside and outside cutting edges designated 27' and 31', respectively. In these views it is assumed that the cutter point width and pressure angles are such that the maximum amount of stock will be removed, the layers of stock left for removal in finishing dwindling to zero at their thinnest points. Under these conditions the cutter will contact the finished surfaces 28 and 32 at points 49' and 47' at the large end of the tooth space, and at points 51' and 48' at the small end. Thus after the roughing operation a relatively great thickness of stock must remain for removal adjacent to the point 45' at the large end of the tooth space.

Figs. 9 and 10 show a cutter blade, with side cutting edges 27, 31 shaped in accordance with the invention, at the small and large ends of the same helicoidally finished tooth space shown in Figs. 7 and 8. The distal section 27*a* of the inside cutting edge corresponds in length to the height of tooth side 28 at its small end, Fig. 9, and its pressure angle, designated B in Fig. 2, is the same as the pressure angle of edge 27'. However the pressure angle C of the proximal section 27*b* is greater than B by an amount such that the inside cutting edge contacts point 45' of the tooth space. The distal section 31*a* of the outside cutting edge corresponds in length to the height of tooth side 32 at its small end. Its pressure angle, D in Fig. 2, is such that its lower end will contact point 51', Fig. 9, and its upper end the tooth side 32, at the large end of the tooth, Fig. 10. However the pressure angle E of proximal section 31*b* is smaller, such that this section contacts the tooth side 32 at the large end of the tooth space, Fig. 10. The new cutter therefore leaves much less stock for removal from both sides 28 and 32 in finish cutting. The greatest improvement is adjacent the points 45' and 53'.

Figs. 7 to 10 are to illustrate the principle only, for in practice it is preferred that the point width of a roughing cutter be such that some stock is left all over the tooth faces for removal by the finishing cutter. The preferred condition is illustrated in Figs. 11 and 12, which are sections in planes through the roughing cutter axis at the small and large ends of a roughed cut tooth space, whose convex and concave sides are designated 28' and 32' respectively. The finish cutting is done by a cutter having a relatively small number of blades, these comprising four inside and four outside blades in the particular case referred to. The four inside blades cut by the helicoidal method respectively to the surfaces 28*a*, 28*b*, 28*c*, and 28, the last being the finished surface. Preferably the first two of these blades remove the remaining inequality in thickness of the layer of stock to be removed, so that the surface 28*b* parallels the finished surface 28 and the layers of stock removed by the last two blades are of constant thickness over the entire tooth side. Similarly the first two outside blades cut respectively to surfaces 32*a* and 32*b*, the latter paralleling the finished surface 32 whereby the last two finishing cutter blades each remove a layer of stock of uniform thickness over the entire tooth side.

As indicated hereinbefore the several layer thicknesses referred to and the disparity between pressure angles B and C, and between pressure angles D and E, have been greatly exaggerated in the drawings for clarity of illustration. In practice, when cutting a typical present day passenger automobile ring gear, the maximum thickness T, Figs. 11 and 12, of stock left for removal by the finishing cutter may be on the order of ten thousandths of an inch. Of this total about three and one-half thousandths may be removed by each of the first two finishing blades for each side in cutting to surfaces 28a and 28b, or to surfaces 32a and 32b. The third blade may remove about two thousandths more, to surface 28c or 32c, and the final blade the remaining one thousandth. The exact pressure angles of the proximal and distal sections of the roughing cutter side cutting edges that will achieve the effect shown in Figs. 9 and 10 may be readily calculated for a gear of any given design. In a typical case, where the relative inclination of the finishing cutter axis to the roughing cutter axis is on the order of six degrees, the difference between pressure angles B and C, and also the difference between angles D and E, will be on the order of one degree. Accordingly the juncture point 61 of sections 27a and 27b and the juncture point 62 of sections 31a and 31b are difficult to see with the naked eye when viewing the blades from the front, as in Fig. 2, but in a proper light the juncture lines 63 and 64, Fig. 1, may be seen on the cutting side surfaces of the inside and outside blades.

Despite their small dimensional differences from conventional cutters, the new roughing cutters provide the very substantial advantages of enabling finishing by the helicoidal method of afore-mentioned application Serial No. 705,931, with a finishing cutter having a small number of cutter blades and with a correspondingly small number of helical motions. For example, referring to Fig. 8, in a typical case the greatest chip thickness, corresponding to the distance between point 45' and the edge 27' of a conventional roughing cutter is on the order of six to ten thousandths of an inch, whereas referring to Fig 10 with the new cutter the maximum thickness of the chip, corresponding to the distance between point 61 and the surface 28, is only about half that amount. Since for reasonable blade life and satisfactory surface finish the maximum allowable chip thickness which can be taken by the first blades of the finishing cutter will usually be on the order of four to six thousandths of an inch, it will be seen that the present invention permits a reduction in the number of blades in the finishing cutter. Since the maximum number of finishing blades is limited by the cutter diameter and the face width of the gear, this difference in many cases will represent the difference between, on one hand, being able to finish, by the helicoidal method referred to above, gears roughed by the conventional method, and on the other hand the inability to do so.

Having described the improved cutter and the manner in which the same is used, what I claim as my invention is:

1. A face mill cutter for rough cutting none-generated spiral bevel or hypoid gears of tapering tooth depth, said cutter comprising blades collectively presenting side cutting edges for cutting one side of the teeth and other side cutting edges for cutting the opposite side of the teeth, each such edge having substantially straight and adjacent distal and proximal sections of different pressure angle, the distal section of each such edge corresponding in length to the depth of the tooth at its small end on the related tooth side, each of the first-mentioned edges having the pressure angle of the proximal section thereof larger than that of its distal section and each of said other edges having the pressure angle of the proximal section thereof smaller than that of the distal section thereof.

2. A face mill cutter for rough cutting non-generated spiral bevel or hypoid gears of tapering tooth depth, said cutter comprising blades collectively presenting inside and outside cutting edges respectively for cutting the convex and concave sides of the tooth spaces, each such edge having substantially straight and adjacent distal and proximal sections of different pressure angle, the distal section of each such edge corresponding in length to the depth of the tooth at its small end on the related tooth side, each inside cutting edge having the pressure angle of the proximal section thereof larger than that of the distal section thereof, and each outside cutting edge having the pressure angle of its proximal section thereof smaller than that of the distal section thereof.

3. A face mill cutter for rough cutting non-generated spiral bevel or hypoid gears of tapering tooth depth, said cutter comprising blades collectively presenting inside and outside cutting edges respectively for cutting the convex and concave sides of the tooth spaces, the inside edges comprising substantially straight and adjacent distal and proximal sections of which the distal sections correspond in length to the depth of the convex tooth side at the toe thereof, and the pressure angle of said proximal sections being greater than that of said distal sections.

References Cited in the file of this patent

UNITED STATES PATENTS

| | | |
|---|---|---|
| 2,216,139 | Stayton | Oct. 1, 1940 |
| 2,252,044 | Stayton | Aug. 12, 1941 |
| 2,267,181 | Wildhaber | Dec. 23, 1941 |
| 2,268,326 | Stewart | Dec. 30, 1941 |
| 2,270,003 | Head | Jan. 13, 1942 |
| 2,358,489 | Carlsen | Sept. 19, 1944 |
| 2,374,890 | Pelphrey | May 1, 1945 |
| 2,385,220 | McMullen | Sept. 18, 1945 |